(12) United States Patent
Hoheisel et al.

(10) Patent No.: US 10,479,501 B2
(45) Date of Patent: Nov. 19, 2019

(54) PAYLOAD ORIENTATION CONTROL AND STABILIZATION

(71) Applicants: Raymond Hoheisel, Washington, DC (US); Justin Lorentzen, Alexandria, VA (US)

(72) Inventors: Raymond Hoheisel, Washington, DC (US); Justin Lorentzen, Alexandria, VA (US)

( * ) Notice: Subject to any disclaimer, the term of this patent is extended or adjusted under 35 U.S.C. 154(b) by 157 days.

(21) Appl. No.: 15/703,201

(22) Filed: Sep. 13, 2017

(65) Prior Publication Data
US 2018/0194467 A1    Jul. 12, 2018

Related U.S. Application Data

(62) Division of application No. 14/995,504, filed on Jan. 14, 2016, now Pat. No. 9,779,960.
(Continued)

(51) Int. Cl.
| | |
|---|---|
| *B64D 1/02* | (2006.01) |
| *B64B 1/40* | (2006.01) |
| *G05D 1/00* | (2006.01) |
| *H04N 5/00* | (2011.01) |
| *H04N 5/232* | (2006.01) |
| *B64B 1/22* | (2006.01) |

(Continued)

(52) U.S. Cl.
CPC ............ *B64D 1/02* (2013.01); *B64B 1/22* (2013.01); *B64B 1/38* (2013.01); *B64B 1/40* (2013.01); *B64B 1/48* (2013.01); *G05D 1/0094* (2013.01); *H04N 5/00* (2013.01); *H04N 5/232* (2013.01)

(58) Field of Classification Search
USPC .............................................................. 701/4
See application file for complete search history.

(56) References Cited

U.S. PATENT DOCUMENTS

| 4,262,864 A | 4/1981 | Eshoo |
| 5,186,414 A | 2/1993 | Holzschuh et al. |

(Continued)

FOREIGN PATENT DOCUMENTS

| CN | 201133936 Y | 10/2008 |
| CN | 102508502 A | 6/2012 |

OTHER PUBLICATIONS

"Lightweight Balloon/Aerostat Observation Payload System," downloaded from http://www.controp.com/item/speed-a-payload, 4 pages.
(Continued)

*Primary Examiner* — James M McPherson
(74) *Attorney, Agent, or Firm* — Banner & Witcoff, Ltd.

(57) ABSTRACT

Systems and methods for maintaining and stabilizing the position and orientation of a payload attached to a high-altitude balloon are provided. A payload may be attached to a powered gimbal. The powered gimbal may be configured to orient and position the payload in a plurality of directions corresponding to a first, second, and third rotational axis of the balloon-mounted payload system. After the payload is positioned by the powered gimbal, the position and orientation of the payload may be maintained and stabilized by one or more rotational stabilization devices. The stabilization by the one or more rotational stabilization devices can occur along any one, or combination of, the first, second, and third rotational axes.

21 Claims, 10 Drawing Sheets

Related U.S. Application Data

(60) Provisional application No. 62/103,313, filed on Jan. 14, 2015.

(51) Int. Cl.
*B64B 1/38* (2006.01)
*B64B 1/48* (2006.01)

(56) References Cited

U.S. PATENT DOCUMENTS

| | | |
|---|---|---|
| 5,463,402 A | 10/1995 | Walrath et al. |
| 5,660,356 A | 8/1997 | Selfors et al. |
| 5,884,867 A | 3/1999 | Gordon et al. |
| 6,402,090 B1 | 6/2002 | Aaron |
| 7,046,934 B2 | 5/2006 | Badesha et al. |
| 7,567,779 B2 | 7/2009 | Seligsohn et al. |
| 8,061,648 B2 | 11/2011 | Lachenmeier |
| 8,157,205 B2 | 4/2012 | McWhirk |
| 8,733,697 B2 | 5/2014 | DeVaul et al. |
| 8,897,933 B1 | 11/2014 | Teller et al. |
| 9,010,691 B1 | 4/2015 | Ratner et al. |
| 9,030,149 B1 | 5/2015 | Chen et al. |
| 9,033,274 B2 | 5/2015 | DeVaul et al. |
| 9,045,213 B1 | 6/2015 | DeVaul |
| 2013/0206915 A1* | 8/2013 | Desaulniers .......... B64C 39/024 244/165 |
| 2014/0054412 A1 | 2/2014 | Guetta et al. |
| 2014/0191893 A1 | 7/2014 | Fox et al. |
| 2014/0263827 A1* | 9/2014 | Smith ...................... B64B 1/22 244/96 |
| 2014/0288694 A1 | 9/2014 | Wagner et al. |
| 2015/0061937 A1 | 3/2015 | Bonawitz et al. |
| 2015/0284065 A1* | 10/2015 | MacCallum .......... B64D 17/22 244/30 |
| 2015/0298788 A1 | 10/2015 | Wang et al. |
| 2016/0207626 A1* | 7/2016 | Bailey .................. B64C 39/022 |

OTHER PUBLICATIONS

Flaten, et al., "Techniquest for Payload Stabilization for Improved Photography During Stratospheric Balloon Flights," downloaded from http://via.library.depaul.edu/cgi/viewcontent.cgi?article=1037&context=ahac, 8 pages.

Kellogg, et al., "2014 WSGC Elijah High-Altitude Balloon Payload Project, Final Report," Aug. 15, 2014, downloaded from https://spacegrant.carthage.edu/ojs/index.php/wsc/article/download/116/115, 10 pages.

* cited by examiner

PAYLOAD ORIENTATION CONTROL AND STABILIZATION

CROSS-REFERENCE TO RELATED CASES

This application is a Divisional application of U.S. application Ser. No. 14/995,504, filed Jan. 14, 2016, having the same title listed above, and which in turn claims priority to provisional U.S. application Ser. No. 62/103,313, filed Jan. 14, 2015, entitled "Balloon Payload Orientation Control and Stabilization," each of which is herein incorporated by reference for all purposes.

FIELD

Aspects described herein are generally related to controlling and stabilizing the angular momentum and rotational movement of payloads attached to a high-altitude balloon. More specifically, aspects of the disclosure relate to apparatuses, systems, and methods for maintaining and stabilizing the position and orientation of a payload attached to a high-altitude balloon.

BACKGROUND

High-altitude balloons have emerged as an increasingly utilized tool for the deployment of research, surveillance, and reconnaissance payloads. As compared to conventional means for payload deployment such as rockets and aircraft which are technologically complex and capital-intensive, high-altitude balloons present a mechanically simple and low-cost alternative.

While the financial appeal for using high-altitude balloons for payload deployment is readily apparent, a number of technological issues currently inhibit the implementation in applications requiring a high degree of payload control and stability. For example, balloon-mounted payloads are highly susceptible to externally applied forces from the immediate atmospheric conditions (e.g., wind, temperature, precipitation, and the like) as well as internal rotational forces generated by moving mechanical components operating within the attached payload. Such effects, whether viewed alone or in combination, may generate significant destabilizing vibrations and oscillations of the payload and the components housed therein. Consequently, balloon-mounted payloads fail to exhibit adequate directional control and/or stability required for many far reaching applications.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure address one or more of the issues mentioned above by disclosing apparatuses, systems, and methods for maintaining and stabilizing the position and orientation of a payload attached to a high-altitude balloon. In at least some examples described herein, a gondola may be attached to a high-altitude balloon. The gondola may comprise a plurality of components including rotational stabilization devices, a powered gimbal, and a payload.

At least one aspect described herein provides for determining the orientation and position of the payload. Upon determining the orientation and position of the payload, calculations may be performed to reorient and reposition the payload in a new direction and orientation. The reorientation and repositioning of the payload may be performed by the powered gimbal to which the payload is attached. Upon determining that the payload has been reoriented and repositioned, additional calculations may be performed to maintain and stabilize the payload as positioned and oriented in the new direction. The rotational stabilization devices may act to rotate and/or stabilize the payload in the new direction.

At least one aspect described herein provides for determining the orientation and position of a carousel device. In such aspects, the carousel device may comprise a plurality of hardware components. Upon determining the orientation and position of the carousel device, as well as the hardware components comprised therein calculations may be performed to reorient and reposition the carousel device in a new direction and orientation. The calculations may additionally call for the internal reorientation and repositioning of the hardware components comprised within the carousel device. The reorientation and repositioning of the carousel device may be performed by the powered gimbal to which the carousel device is attached. Upon determining that the carousel device has been reoriented and repositioned, as well as the hardware components comprised therein, additional calculations may be performed to maintain and stabilize the carousel device as positioned and oriented in the new direction. The rotational stabilization devices may act to rotate and/or stabilize the payload in the new direction.

The details of these and other aspects of the disclosure are set forth in the accompanying drawings and descriptions below. Other features and advantages of aspects of the disclosure may be apparent from the descriptions and drawings.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
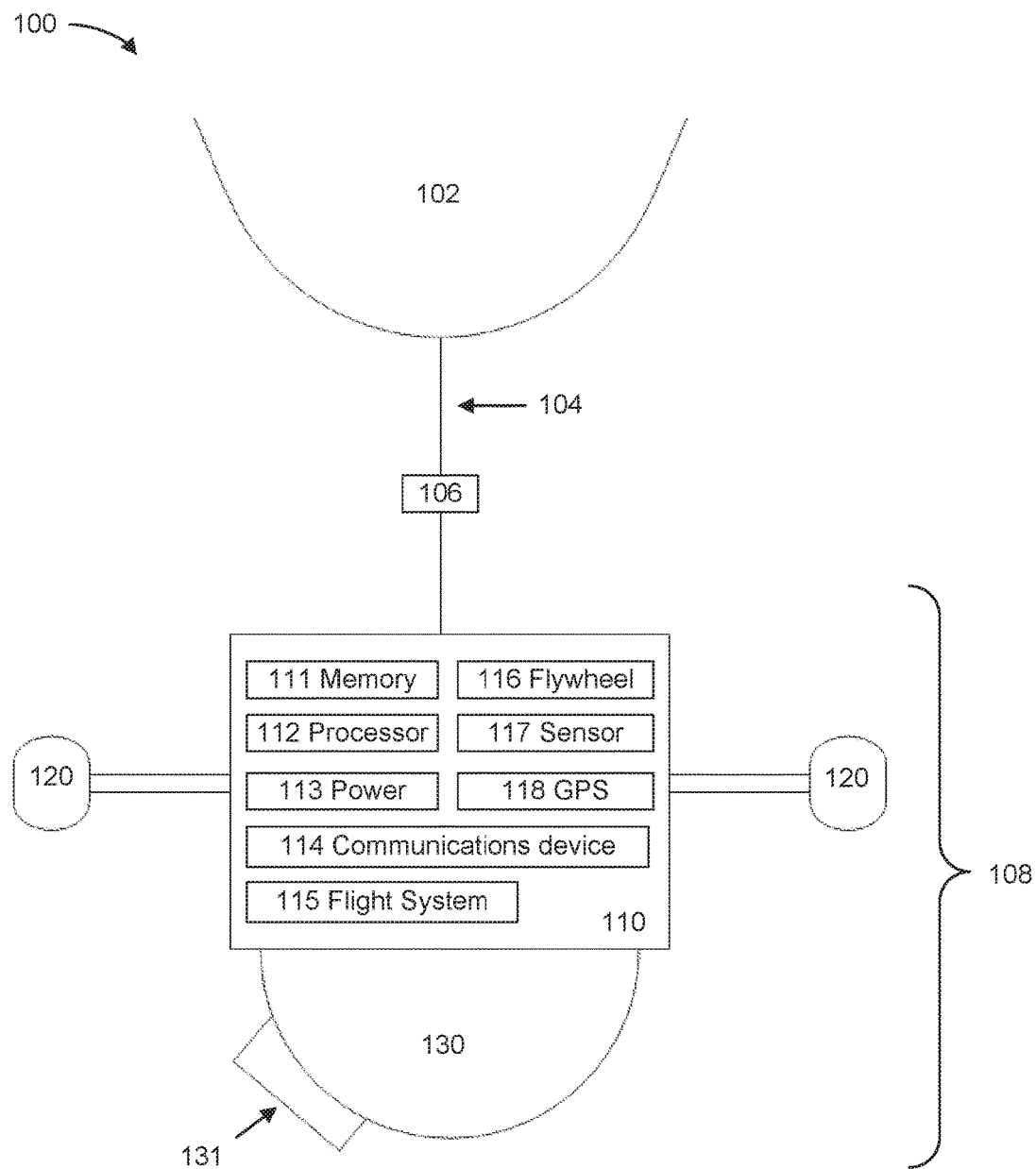
FIG. 1 illustrates a schematic diagram of a balloon payload orientation control and stabilization system according to one or more aspects described herein.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Aspects described herein contribute to balloon based platforms performing various functions such as research, surveillance, reconnaissance, telecommunications, mapping, and the like. Such balloon platforms may include an individual balloon functioning independently, or of a network of balloons acting in tandem. These balloons may communicate with each other using optical or radio-frequency communications. Communications systems may utilize LEDs, lasers, radio signals and/or other antenna-based communications as described in further detail below.

In some aspects, a balloon platform system may include one or more balloons and accompanying payloads and may be configured to perform a variety of functions. The platform may communicate with other platforms and/or ground stations and may be able to operate autonomously or via remote command. The platform may be designed for a variety of missions, such as short duration flights or remaining at altitude.

In some embodiments, a balloon platform may include a network of balloons. The balloons in such a network may be substantially similar to one another and may be configured to perform similar functions, different functions, and/or complementary functions. The balloons may be able to communicate with one another as well as ground-based platforms. The specific functions of each individual balloon may be tailored depending on the intended function. For example, in some embodiments, the hardware, functionality and intra-balloon network communications may be generally homogenous, but heterogeneous with respect to external communications.

In other embodiments, a balloon platform may include a heterogeneous network of balloons that includes multiple types of balloons. The balloons may each be configured to perform specific functions. For example, in some embodiments, one type of balloon may be configured as a communication node and communicate with all the other balloons in the network as well as ground-based platforms while other balloons may perform external functions and only communicate to the communication node balloon(s).

Instruments and electronic equipment within the payload may be used to record various data and information or otherwise respond to exposure to the external environment in such a way that may be benefited by orientation control and stabilization. This hardware may benefit from the ability to maintain a specific orientation and/or may benefit from the ability to move through a number of specific orientations in a controlled fashion.

According to an illustrative aspect, additional hardware may be oriented through the use of a powered gimbal. This powered gimbal may, in turn, be mounted directly, or indirectly, to one or more rotational stabilization (or modulation) devices. As used herein, reference to a stabilization device or devices may include one or more modulation devices to assist, limit, and/or control rotation about an axis. The one or more rotational stabilization devices may be configured to function as one or more yaw momentum stabilization devices, which may be configured to stabilize yaw momentum generated by the orientation powered gimbal, the atmospheric environment, and/or other moving parts of the payload. Momentum in pitch and roll is typically dissipated by gravity and/or air friction and thus requires little or no momentum stabilization. However, designs contemplated herein may be configured to provide momentum stabilization (or modulation) for the pitch and roll axes.

By combining a powered gimbal and one or more rotational stabilization devices, the types of balloon configurations that can provide orientation control and stability is significantly expanded. For example, the additional hardware being oriented, as discussed further below, may comprise a significant portion of the mass of the payload and/or the entire balloon system. In such configurations, the orientation of the additional hardware cannot be controlled without introducing significant yaw momentum in the system that could not be dissipated without rotational modulation hardware.

The yaw momentum stabilization hardware may include a flywheel functioning as a momentum wheel that resists yaw deflection and disperses imparted yaw torque into the pitch and/or roll or other axes. The yaw momentum stabilization hardware may further include a flywheel functioning as a reaction wheel that generates yaw momentum directly and/or rotational stabilization hardware that generate yaw thrust. The flywheel or flywheels may also function as a control moment gyroscope or a variable speed control moment gyroscope (CMG). Depending on the desired functionality, the yaw momentum stabilization hardware may mitigate yaw momentum generated by the powered gimbal, the atmospheric environment and/or other moving parts of the payload or it may additionally provide azimuth or skew orientation control.

FIG. 1 shows an illustrative balloon payload orientation control and stabilization system 100. The balloon payload orientation control and stabilization system 100 may include a balloon envelope 102, a coupling member 104 attached to a bottom end portion of balloon envelope 102 at first distal end of coupling member 104, and a gondola 108 positioned below balloon envelope 102 and coupled at an upper end portion to a second distal end of coupling member 104. Coupling member 104 may function to attach gondola 108 to balloon envelope 102.

Balloon envelope 102 may be fabricated in a multitude of forms, shapes, sizes and may be composed of any one of latex, chloroprene, polyethylene, Mylar, and the like.

Additionally or alternatively, balloon envelop 102 may be constructed from Stratofilm-430. Balloon envelope 102 may be composed of a combination of any of the above-mentioned materials. In certain embodiments, other materials may be used. In certain embodiments, balloon envelope 102 may be a commercially available Kaymont 1200 g balloon, or any other suitable balloon. Balloon envelope 102 may be configured to be an inflatable and deflatable vessel, and may be filled during inflation with a lighter-than-air lifting gas. Such a gas may include, but is not limited to, one of helium, hydrogen, and/or methane. In some instances, other gases may be used. The gas, as used to inflate balloon envelope 102, may cause balloon payload orientation control and stabilization system 100 to ascend into the atmosphere. In certain embodiments, one or more balloon envelopes may be used. In some embodiments, a weather balloon may be used.

As stated above, balloon envelope 102 may be attached to gondola 108 via coupling member 104. Coupling member 104 may be a traditional coupling member such as a cord, cable, wire, chain, or the like, and may vary in length and diameter depending on the application. In some embodiments, a plurality of coupling members may be used. A first distal end of coupling member 104 may attach to a bottom end portion of balloon envelope 102 and a second distal end of coupling member 104 may attach to an upper end portion of gondola 104 through any of a variety of attachment means including, but not limited to, a pin, fastener, clamp, or utilization of adhesive. Other attachment devices and/or methods may be used.

Gondola 108 may comprise a central housing unit 110, one or more rotational stabilization devices 120, and powered gimbal 130. Central housing unit 110 of gondola 108 may be composed of metal (e.g., aluminum), foam composite, carbon fiber, fiberglass, or plastic and may comprise a plurality of components including memory 111, processor 112, power module 113, communications device 114, flight system 115, flywheel 116, sensor 117, and GPS 118. While the plurality of components are discussed herein as being comprised within central housing unit 110 of gondola 108, it should be understood that such components (e.g., memory 111, processor 112, power module 113, communications device 114, flight system 115, flywheel 116, sensor 117, and GPS 118) may also, in certain embodiments, be located and/or housed in other areas of balloon payload orientation control and stabilization system 100. For example, one or more of the plurality of components comprised within central housing unit 110 may be included in powered gimbal 130, payload 131, balloon envelope 102, and the like. In certain instances, other housing devices may comprise the plurality of components.

The plurality of components comprised within central housing unit 110 may be configured so as to perform the balloon payload orientation control and stabilization methods described herein. For example, memory 111 may store data and/or instructions that, when accessed by processor 112 (e.g., a commercially available Amtel microprocessor, Broadcom microprocessor, or any suitable microprocessor), may cause balloon payload orientation control and stabilization system 100 to execute balloon orientation and stabilization methods described herein, or as otherwise called for based on the functionality of payload 131. In such embodiments, processor 112 via data and/or instructions stored in memory 111 may control balloon payload orientation control and stabilization system 100 through the utilization and/or actuation of components such as, but not limited to, balloon release device 106, one or more rotational stabilization devices 120, powered gimbal 130, payload 131, communications device 114, flight system 115, flywheel 116, sensor 117, and GPS 118. In certain embodiments, one or more memory storing devices and/or processors may be used. While not explicitly shown in FIG. 1, memory 111 may be a plurality of memory devices and processor 112 may be a plurality of processors.

Power module 113 may be configured so as to provide electrical energy to the components of balloon payload orientation control and stabilization system 100. In certain embodiments, balloon envelope 102 and/or gondola 108 and/or certain environmentally exposed components comprised therein (e.g., one or more rotational stabilization devices 120, central housing unit 110, powered gimbal 130, etc.) may include solar panels/cells mounted thereon so as to translate solar energy into electrical energy for storage in power module 113. In other embodiments, power module 113 may include one or more exhaustible batteries, one or more rechargeable batteries (e.g., 18650 Lithium Ion batteries or other suitable rechargeable batteries), or the like. In some instances, power module 113 may derive electrical energy from the kinetic movement of the rotational members comprised within balloon payload orientation control and stabilization system 100 (e.g. flywheel 116, powered gimbal 130, etc.) Such energy sources and/or translation methods may be used alone, or in combination. In certain embodiments, other energy sources and/or translation methods may be used.

In certain embodiments, central housing unit 110 of gondola 108 may further comprise communications device 114 which may be, but is not limited to, one of radio frequency transmitters and/or receivers, optical communications hardware, and/or other communications devices. Communications device 114 may also include an Iridium modem and receiver (e.g., an Iridium RockBlock satellite modem or any other suitable Iridium or other satellite modem), GPRS modem (or any other modem), FRS UHV radio (or any other radio frequency radio), cellular telecommunications modem, and the like. While not explicitly shown in FIG. 1, communication device 114 may be a plurality of communications devices such as those mentioned above. Such a plurality of communications devices may be of a like type, or may be of a different type. Communications device 114 may enable secure communications with a direct link to ground personnel, radio towers, other balloon systems similar to balloon payload orientation control and stabilization system 100, satellites, and the like.

Central housing unit 110 of gondola 108 may also include flight system 115 which may include any one, or combination of, motor drivers for one or more rotational stabilization devices 120, flywheel 116, powered gimbal 130, and/or payload 131 and sirens. While such components are described in regards to FIG. 1 as being included in flight system 115 within central housing unit 110, other locations may be possible.

As stated above, flywheel 116 may also be comprised in central housing unit 110. In certain instances, there may be a single flywheel 116, and in others, there may be a plurality of flywheels comprised in central housing unit 110. Such a plurality of flywheels may be oriented in a like direction, or may be oriented orthogonally along any one, or combination of, the pitch, roll, and yaw axes of the balloon payload orientation control and stabilization system 100, or may be oriented otherwise, for example in a tetrahedral configuration. In certain instances, flywheel 116 may operate in tandem with one or more rotational stabilization devices 120 so as to orient and stabilize balloon payload orientation control and stabilization system 100. The flywheel 116 or flywheels may function to transfer angular momentum in such a way that it may be dispersed into the environment through other rotational stabilization systems 120 like propellers or thrusters. Such orientation and stabilization of balloon payload orientation control and stabilization system 110 may occur along any one, or combination of, the pitch, roll, and yaw axis of balloon payload orientation control and stabilization system 100. In some embodiments, one or more rotational stabilization devices 120 may not be included in balloon payload orientation control and stabilization system 100 and, in such cases, flywheel 116 may operate alone to orient and stabilize balloon payload orientation control and stabilization system 100. Flywheel 116 may be independently powered such that they generate rotation of gondola 108 around the vertical axis and/or they connect rotation of the central housing unit 110 around the vertical axis to tilt and roll rotation. Thus, the yaw orientation of payload 131 and central housing unit 110 may be controlled independently and yaw rotation imparted by powered gimbal 130 to the central housing unit 110 or vice versa may be stabilized by each system component. In other embodiments, flywheel 116 may not be included in balloon payload orientation control and stabilization system 100.

In certain instances, central housing unit 110 of gondola 108 may include sensors 117 such as, but not limited to, sun-angle sensors, measurement equipment for solar characterization, antennas, accelerometers, magnetometers, gyroscopes, barometers and/or other pressure sensors (e.g., Bosch barometer or the like), thermometers (e.g., PT100 temperature sensor, DS18B20 temperature sensor, or the like), cameras (e.g., GoPro or the like), and/or other sensors for capturing environmental and/or balloon payload orientation control and stabilization system related phenomena (e.g., InvenSense inertial management unit). While not explicitly shown in FIG. 1, sensor 117 may be a plurality of sensors. Such a plurality of sensors may include any one, or combination of, the above-motioned sensors. Central housing unit 110 may also comprise a GPS 118 and/or other positioning systems such as an inertial management and navigation system, star-tracking system, terrain-tracking system, and or other location determination/positioning systems of the like. Data corresponding to phenomena detected by sensor 117 and/or locational information provided by GPS 118 may be stored in memory 111. In some embodiments, processor 112 may utilize such data to perform various calculations regarding the methods described in further detail below. Furthermore, data may be transmitted by communications device 114. Such data transmission may be done in real-time, in symmetric intervals, or randomly in response to observation of certain phenomena correlating to predetermined and/or prestored data points (e.g., temperature below −50° Celsius, barometric pressure readings indicating a hurricane and/or tornado, arrival at specific GPS coordinates, etc.). Such data points may be predetermined and/or prestored in memory 111 and subsequently accessed, and compared to measured data points by processor 112.

One or more rotational stabilization devices 120 may be fixed to an exterior surface of central housing unit 110. The one or more rotational stabilization devices 120 may include hardware such as propellers, impellers, air thrusters, rockets, and/or nozzles and may be driven by a motor (e.g., brushless motor or the like) via an electronic speed controller. Other suitable hardware configured to generate rotation of gondola 108 may also be included. While described herein as being attached to central housing 110 of gondola 108, the one or more rotational stabilization devices 120 may, in certain embodiments, be attached to other system components (e.g., balloon envelope 102, coupling member 104, powered gimbal 130, etc.). Furthermore, the one or more rotational stabilization devices may be configured as yaw momentum stabilization devices and may provide orientation and stabilization of balloon payload orientation control and stabilization system 100 around the yaw axis. In other configurations, orientation and stabilization around the pitch and roll axes may be controlled. As stated above, the one or more rotational stabilization devices 120 may be configured to operate alone, or in tandem, with flywheel 116. In such embodiments, flywheel 116 may be mounted along one or more axes and configured to generate yaw momentum and/or convert yaw momentum into tilt and roll momentum. One or more rotational stabilization devices may be oriented around complementary axes to that/those of flywheel 116 and, as such, be configured to provide further stabilization. In such an instance, flywheel 116 may be a momentum wheel or CMG and, as such, may be configured to rotate around an axis different than that of the axis of stabilized by the one or more rotational devices. For example, the one or more rotational stabilization devices 120 may be configured to stabilize balloon payload orientation control and stabilization system 100 around the yaw axis and, in such a configuration, flywheel 116 may be a momentum wheel or CMG and may be configured to rotate around the fly and/or tilt axis. Other configurations of the one or more rotational stabilization devices 120 and flywheel 116 may be possible. The one or more rotational stabilization devices may be further configured, in certain instances, to compress atmospheric gases and/or to use gases inside the balloon envelope for thrust generation.

In certain embodiments, the balloon payload orientation control and stabilization system 100 may include a balloon envelope 102 connected to a central housing unit 110 on which is mounted a powered gimbal 130 supporting a payload 131. As described in further detail below, memory 111 may store instructions that, when accessed by processor 112, may cause powered gimbal 130, through elevation and/or azimuth rotations, to orient and direct the payload 131 to point towards a certain point in space. Additionally, memory 111 may store further instructions that, when executed by processer 112, may cause the one or more rotational stabilization devices 120 to maintain a set azimuthal orientation, stabilize gondola 108 and, by extension, payload 131 as directed towards the above-mentioned point in space. Such stabilization by the one or more rotational stabilization devices 120 may be caused through generated thrust via one of propellers, impellers, air thrusters, electromagnetic thrusters, rockets, nozzles or the like. In certain embodiments, the orientation and stabilization function may be performed by one or more rotational stabilization devices 120 in tandem with flywheel 116. The powered gimbal 130 may include one or more motors (e.g., brushless motors or the like) and/or servos that may be arranged along normal and/or non-normal axes to provide angular adjustment of the payload 131. Powered gimbal 130 may be configured to rotate around more or less than the tilt, roll, and yaw axes depending on the type of rotational stabilization devices used (e.g., propellers, impellers, air thrusters, rockets, nozzles, etc) and the arrangement of the rotational stabilization devices (e.g., any one, or combination of, the tilt, roll, and yaw axes, and/or other axes). In such instances, powered gimbal 130 may be configured to rotate around different axes than those of the rotational stabilization devices. The rotational stabilization devices 120 may be mounted to the central housing unit 110, facing the same direction on opposing sides of the central vertical axis of gondola 108.

The motors may be independently powered such that they generate rotation of the gondola 108 around the vertical axis via the one or more rotational stabilization devices 120. Thus, the yaw orientation of the payload 131 and the central housing 110 may be controlled independently, and yaw rotation imparted by the atmospheric environment, other moving parts of the payload and/or the powered gimbal 130 to the central housing 110 or vice versa can be stabilized by each part. In some embodiments, a plurality of powered gimbals 130 may be fixed to different portions of central housing unit 110. Each powered gimbal of the plurality of powered gimbals may comprise a respective payload 131. The payloads may comprise identical hardware, or different hardware depending on the embodiment.

In certain embodiments, payload 131 may include a carousel device. As discussed in further detail in regards to FIG. 3, the carousel device may comprise an internal rotatable mechanism further comprising a plurality of hardware components. Such a carousel device may be able to seamlessly interchange and direct each hardware component of the plurality of hardware components to the same point in space. Such a device may also allow for passive temperature control be rotating hardware into and out of direct sunlight.

A balloon release device 106 may be fixed to coupling member 104 and may be positioned between balloon envelope 102 and gondola 108. Memory 111 may store instructions that, when accessed processor 112, may cause balloon release device 106 to detach gondola 108 from balloon envelope 102. Balloon release device 106 may receive instructions from processor 112 to detach gondola 108 from balloon envelope 102 when a certain altitude has been reached by balloon payload orientation control and stabilization system 100. Information corresponding to such an altitude may be predetermined and/or prestored in memory 111. In other embodiments, balloon release device 106 may receive instructions from processor 112 to detach gondola 108 from balloon envelope 102 after a certain time duration has elapsed (e.g., one hour, three days, eleven weeks, etc.). Such a time duration may be measured from the initial time of the deployment of balloon payload orientation control and stabilization system 100 and may be stored in memory 111. In other embodiments, balloon release device 106 may receive instructions from a third party (e.g., ground control, satellite, other balloon, etc.) via communication device 114 to detach gondola 108 from balloon envelope 102. In other embodiments, balloon envelope 102 may be designed so as to burst under certain atmospheric and/or flight conditions (e.g., after a certain amount of deployment time, upon exposure to certain atmospheric pressure, etc.). In such embodiments, sensor 117 and/or GPS 118 may generate data indicative of such a rupture of balloon envelope 102 and thereby cause processor 112 to activate balloon release device 106 to detach gondola 108 from balloon envelope 102. Detachment performed by balloon release device 106 may be performed through severing coupling member 104 via a heated wire member (e.g., Iridium cut-off), severing coupling member 104 via a cutting member (e.g., guillotine-like device), disengaging from coupling member 104 via a clasping member, or the like.

In certain embodiments, a parachute may be additionally fixed to coupling member 104 below balloon release device 106. The parachute may be composed of nylon, canvas, silk, Kevlar, terylene, or the like, and may be fabricated in a multitude of forms, shapes, and sizes. Such a parachute may additionally include guidance hardware that allows gondola 108 to perform a controlled descent to the earth's surface. Furthermore, a radar reflector may be fixed to coupling member 104 below the parachute. Such a radar reflector may be configured to respond to incoming radar so as to alert aircraft in the immediate vicinity to the presence of balloon payload orientation control and stabilization system 100.

Figure 2:
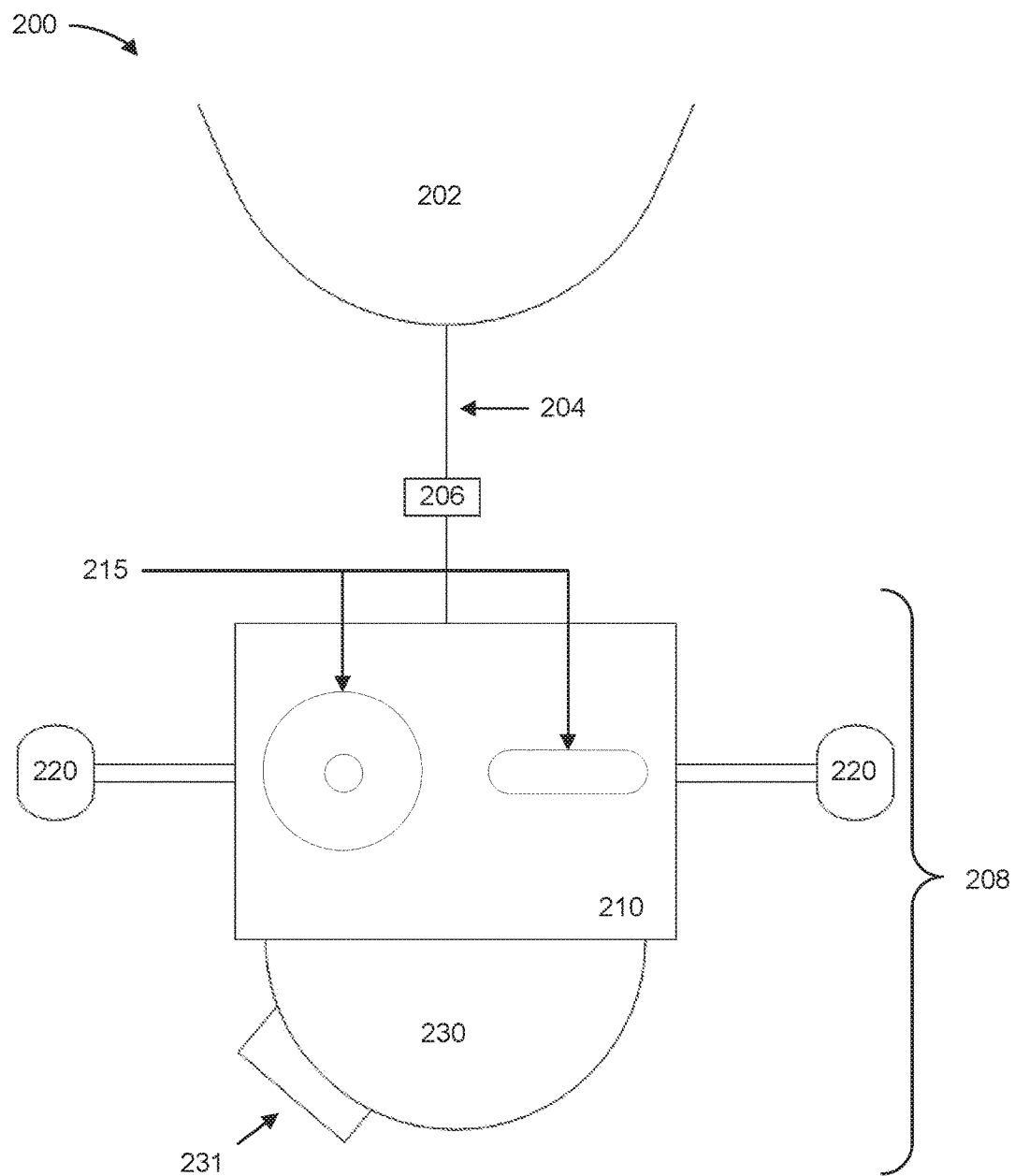
FIG. 2 illustrates a schematic diagram of yaw stabilization hardware of a balloon payload orientation control and stabilization system according to one or more aspects described herein.

FIG. 2 depicts yaw stabilization hardware of a balloon payload orientation control and stabilization system 200 according to certain embodiments described herein. Balloon payload orientation control and stabilization system 200 may comprise some or all of the hardware/software components as balloon payload orientation control and stabilization system 100 as depicted in FIG. 1. Balloon payload orientation control and stabilization system 200 may include a gondola 208 suspended below a balloon envelope 202. Gondola 208 may include a central housing unit 210 containing yaw stabilization hardware, which may include one or more rotational stabilization devices 220 and/or one or more flywheels 215. The rotational stabilization devices 220 may include propellers, impellers, electromagnetic thrusters, rockets, nozzles, or other types of propulsion. A powered gimbal 230 may be mounted on the central housing unit 210. A payload 231 may be mounted on the powered gimbal 230, and may include instruments and/or electronic equipment. Alternate embodiments may include the powered gimbal 230 or yaw stabilization hardware separately.

The gondola 208 may provide high-performance stabilization and orientation control of the payload 231 through action of the powered gimbal 230 combined with the yaw stabilization provided by the one or more rotational stabilization devices 220 and/or the one or more flywheels 215.

The powered gimbal 230 may provide active orientation control and stabilization for the payload 231. The action of the powered gimbal 230 may impart momentum to the rest of the gondola 208. Tilt and roll momentum may be dissipated by gravity and/or air friction of the gondola 208. The yaw stabilization hardware may dissipate imparted yaw momentum and may provide additional yaw control. As such, yaw stabilization hardware (e.g., one or more rotational stabilization devices 220 and/or one or more flywheels 215) may thus allow for the continuous orientation control and stabilization of the payload 231.

For example, if the balloon envelope 202 and gondola 208 were spinning clockwise (CW) due to environmental and/or internal influences, and the powered gimbal 230 was programmed to direct and orient payload 231 towards a specific point in space (e.g., facing south or some other specified direction) this would require the powered gimbal 230 to rotate the payload 231 counterclockwise (CCW) and thereby generate additional yaw momentum in the CW direction. Such yaw momentum may be imparted on the rest of balloon payload orientation control and stabilization system 200 (e.g., balloon envelope 202, gondola 208, etc.). Eventually, the combination of yaw momentum generated by the environmental and/or internal influences may cause gondola 208 to spin too quickly in the CW direction for powered gimbal 230 to be able to maintain payload 231 in the programmed orientation. The yaw stabilization hardware allows the imparted yaw momentum to be dissipated or otherwise countered through one or more rotational stabilization devices 220 and/or one or more flywheels 215. Thus the gondola 204 can maintain the orientation of payload 231.

Figure 3:
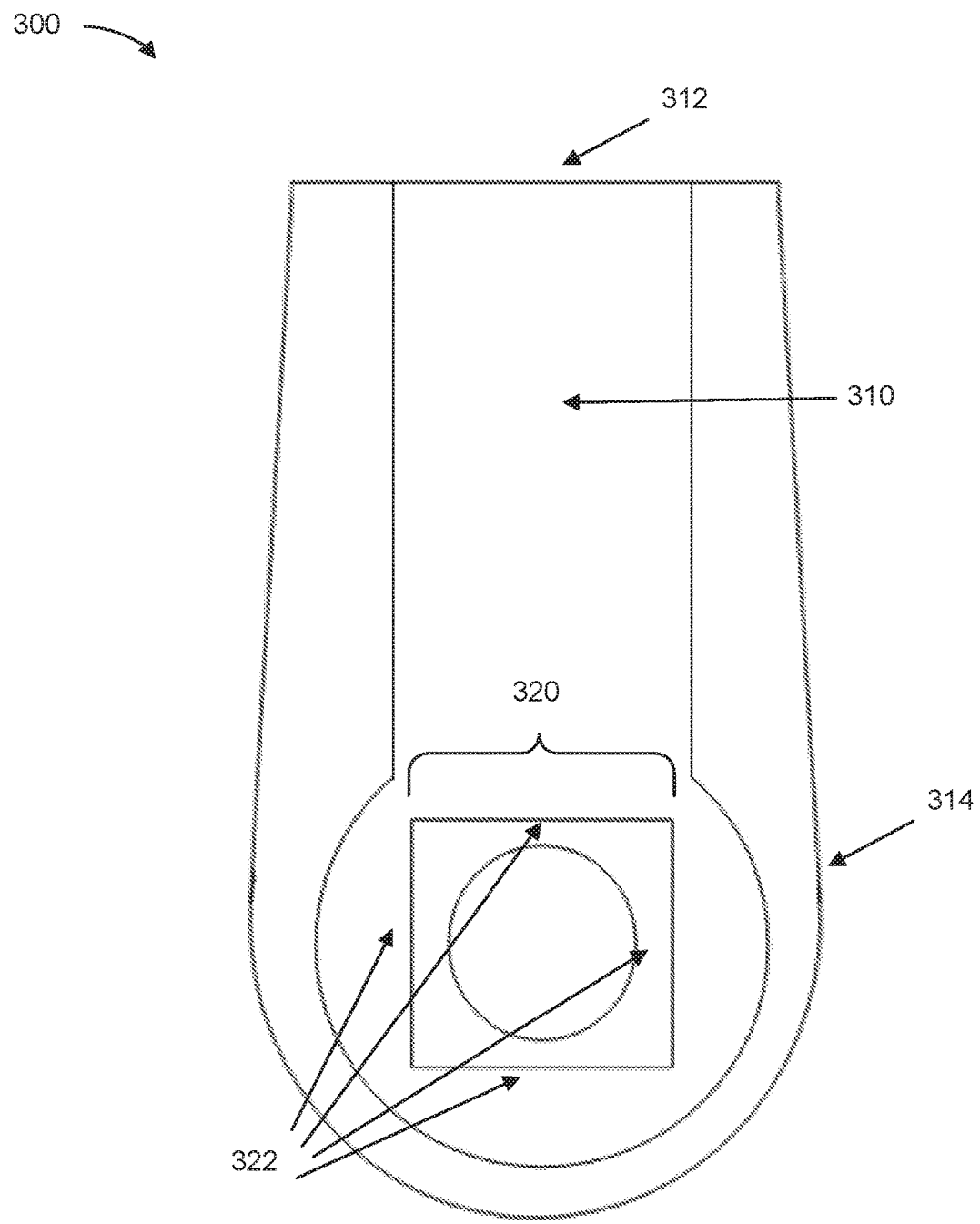
FIG. 3 illustrates a schematic diagram of a carousel device according to one or more aspects described herein.

FIG. 3 depicts an embodiment of a payload as carousel device 300. Carousel device 300 may comprise collimator 310 including an outer end portion 312 exposed to the atmospheric environment and an inner housing portion 314. Inner housing portion 314 of collimator 310 may include rotatable mechanism 320 comprised therein. Rotatable mechanism 320 may comprise a plurality of outer faces 322.

Each outer face of the plurality of outer faces 322 may serve as fixture point for specialized hardware components. Such hardware components may include, but are not limited to, solar cells, GPS receivers, cameras, sensors, antennas, communication equipment, and the like. In some embodiments, each face out face of the plurality of outer faces 322 may comprise a unique specialized hardware component.

Rotatable mechanism 320 may be configured to rotate so as to expose an outer face of the plurality of outer faces 322 towards collimator 310 and, ultimately, outer end portion 312. Such rotation may be caused by instructions stored in memory 111 that, when executed by processor 112, may activate a motor comprised within rotatable mechanism 320. The execution of rotation of rotatable mechanism 320 may be prompted by input received from sensor 117, GPS 118, instructions received via communications device 114, data prestored in memory 111, or the like. For example, GPS 118 may provide data indicating that the balloon payload orientation control and stabilization system 100 has arrived at a certain prestored geographic position and/or area stored within memory 111. In such an example, processor 112 may execute instructions comprised within memory 111 that cause a specific outer face of the plurality of outfaces 322 and the hardware component comprised therein to be exposed towards collimator 310. In other instances, sensor 117 may indicate that atmospheric temperature has dropped below a certain prestored threshold (e.g., −50° Celsius) at which certain hardware of the plurality of hardware can incur damage. In such an instance, processor 112 may execute instructions that cause the rotatable mechanism to rotate, and thereby conceal, the certain piece of hardware away from collimator 310 into a non-outwardly exposed portion of inner housing portion 314. In yet another example, communications device 114 may receive information instructing the exposure of a certain hardware component of the plurality of hardware components. In such an instance, the received information may comprise instructions that, when executed by processor 112, cause rotatable mechanism 320 to rotate and expose the specified face and hardware components fixed thereto.

Carousel device 300 may comprise mechanical components allowing for the rotation and positioning of carousel device 300 and the components comprised therein without activation of powered gimbal 130. In some examples, carousel device 300 may be configured to be rotatable positioned by mechanical components comprised therein in conjunction with movement of powered gimbal 130. In other examples, carousel device 300 may be a fixed member and require activation of powered gimbal 130 to be positioned and oriented.

Figure 4:
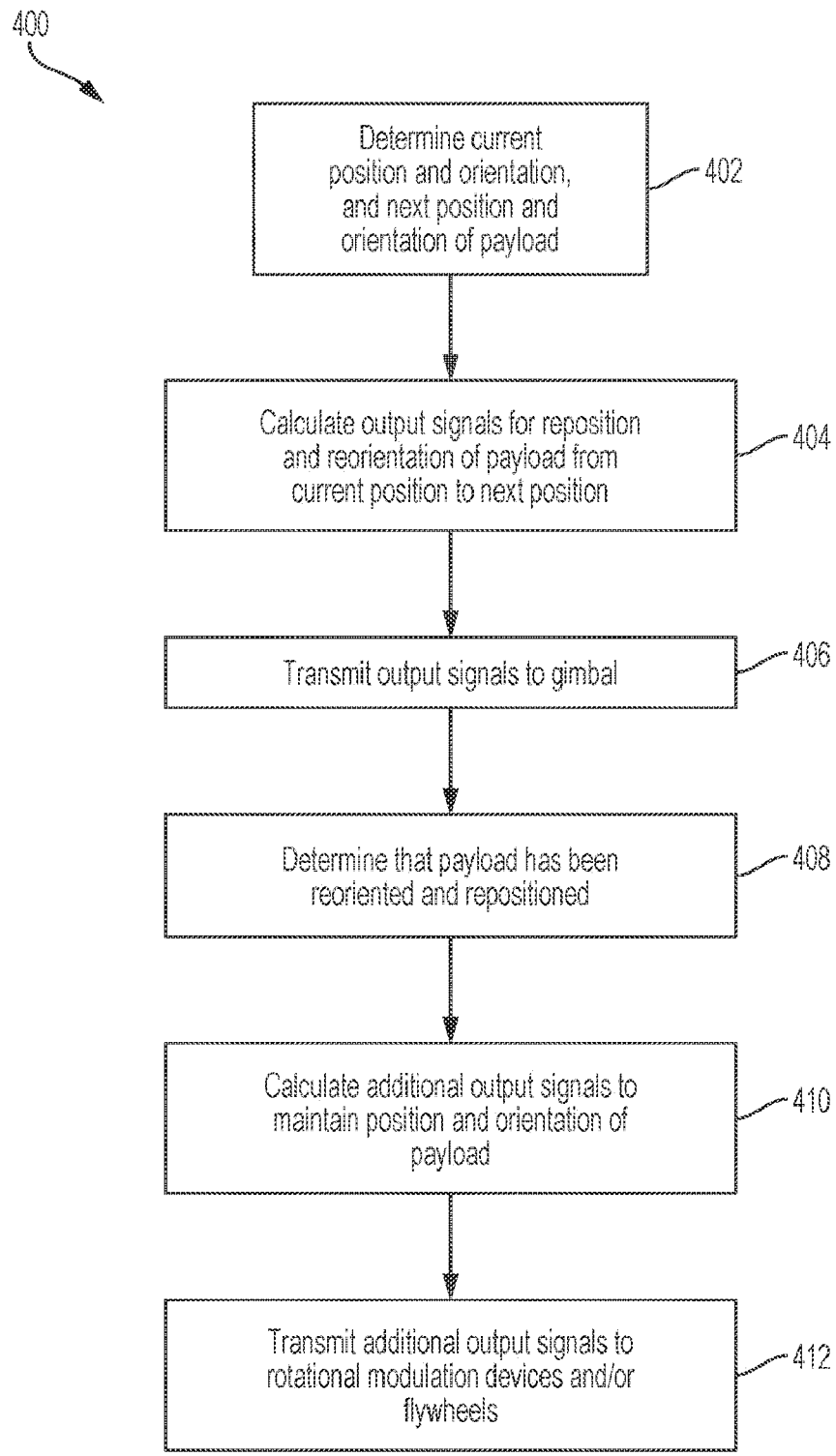
FIG. 4 depicts a flowchart for a first balloon payload orientation control and stabilization method according to one or more aspects described herein.

FIG. 4 shows an illustrative method of orienting and positioning payload 131 of the balloon payload orientation control and stabilization system 100. Such a method may be performed on board balloon payload orientation control and stabilization system 100 by one or more processors 112 or off board at an external processing center. At step 402, the current position and orientation of payload 131 may be determined. In certain embodiments, the position and orientation of payload 131 may be determined relative to the position and orientation of balloon payload orientation control and stabilization system 100. Additionally, the next position and orientation of payload 131 may be determined. The next position and orientation of payload 131 may be different than the current position and orientation of payload 131.

The determination of the current position and orientation of payload may be done through contribution of data provided by sensor 117. In other embodiments, the determination may be done through the utilization of input commands previously generated and executed to achieve the current positioning. The two forms of determination may be performed alone, or in combination. In other instances, other means of determining the position and orientation of payload 131 may be used. Additionally, the determination of the next position and orientation of payload 131 may be determined through instructions received via communications device 114, instructions prestored in memory 111 corresponding to prestored GPS locations and/or sensor readings.

At step 404, after determining the current and next orientations and positions of payload 131, powered gimbal rotational commands may be calculated. Such powered gimbal rotational commands may contain instructions that, when executed, cause powered gimbal 130 to reposition and reorient payload 131 to the next position and orientation from the current position and orientation. Depending on the embodiment, calculation of powered gimbal rotational commands may be done on-board or off-board.

At step 406, output signals including the calculated powered gimbal rotational commands may be transmitted to powered gimbal 130. After receiving the output signals, powered gimbal 130 may reorient and reposition payload 131. Such reorientation and repositioning may be achieved through rotation of powered gimbal 130 around any one, or combination of, a first, second, third or more axes of rotation.

After the output signals for the reorientation and repositioning of payload 131 have been transmitted to powered gimbal 130, a determination may be made at step 408 that such a reorientation and repositioning has been completed. Such a determination may be made via information provided by sensor 117 and/or powered gimbal 130.

At step 410, in response to determining that payload 131 has been reoriented and repositioned, rotational stabilization device rotational commands may be calculated which may comprise instructions for maintaining and stabilizing the position and orientation of payload 131 at the new location in specific regards to the yaw axis. In other embodiments, the calculations of rotational stabilization device rotational commands may be made for maintaining and stabilizing the position and orientation of payload 131 at the new location in specific regards to the yaw axis, pitch axis, roll axis, or any combination of axes thereof.

The calculation may take into account data provided by sensor 117 regarding external atmospheric phenomena such as wind speed, wind direction, barometric pressure, presence of wind gusts, precipitation, and the like. As stated above, such phenomena may incur rotation around the yaw axis of balloon payload orientation control and stabilization system 100. Accordingly, the calculation of rotational stabilization device rotational commands may adjust for the presence of such phenomena. In some embodiments, the calculations may be done seamlessly and in real-time as atmospheric change and are detected by sensor 117. The calculations completed at step 410 may also take into account the rotation of balloon payload orientation control and stabilization system 100 around the yaw axis as produced by powered gimbal 130 during the reorientation and repositioning of payload 131.

Moreover, the calculation may take into account additional data provided by sensor 117 and GPS 118 regarding motion and trajectory of balloon payload orientation control and stabilization system 100. For example, if it is desired that payload 130 remain fixed towards a certain point in space, calculations of rotational stabilization device rotational commands may take into account the movement of balloon payload orientation control and stabilization system 100 so as to maintain orientation of payload 130 towards the certain point.

At step 412, the rotational stabilization device rotational commands may be transmitted in the form of second output signals to one or more rotational stabilization devices 120 which, upon receiving the second output signals, may employ any of a plurality of thrust generating means such as, but not limited to, air thrusters, propellers, impellers, electromagnetic thrusters, rockets, and like, in order to maintain and stabilize the orientation and positioning of payload 116. One or more rotational stabilization devices 120 may maintain and stabilize the orientation and positioning of payload 116 around the yaw axis of balloon payload orientation control and stabilization system 100. In other embodiments, the one or more rotational devices 120 may maintain and stabilize the orientation and positioning of payload 116 around the yaw, pitch, and/or rolls axis of balloon payload orientation control and stabilization system 100.

In some embodiments, in response to determining that payload 131 has been reoriented and repositioned, flywheel rotational commands may be calculated which may comprise instructions for maintaining and stabilizing the position and orientation of payload 131 at the new location in specific regards to the yaw axis. In other embodiments, the calculations of flywheel rotational commands may be made for maintaining and stabilizing the position and orientation of payload 131 at the new location in specific regards to the yaw axis, pitch axis, roll axis, or any combination of axes thereof.

The calculation may take into account data provided by sensor 117 regarding external atmospheric phenomena such as wind speed, barometric pressure, presence of wind gusts, precipitation, and the like. As stated above, such phenomena may incur rotation around the yaw axis of balloon payload orientation control and stabilization system 100. Accordingly, the calculation of flywheel rotational commands may adjust for the presence of such phenomena. In some embodiments, the calculations may be done seamlessly and in real-time as atmospheric change and are detected by sensor 117. The calculations may also take into account the rotation of balloon payload orientation control and stabilization system 100 around the yaw axis as produced by powered gimbal 130 during the reorientation and repositioning of payload 131.

Moreover, the calculation may take into account additional data provided by sensor 117 and GPS 118 regarding motion and trajectory of balloon payload orientation control and stabilization system 100. For example, if it is desired that payload 130 remain fixed towards a certain point in space, calculations of flywheel rotational commands may take into account the movement of balloon payload orientation control and stabilization system 100 so as to maintain orientation of payload 130 towards the certain point.

The flywheel rotational commands may be transmitted in the form of output signals to flywheel 116 which, upon receiving the output signals, may rotate around the yaw, pitch, and/or roll axis in order to maintain and stabilize the orientation and position of payload 116. Flywheel 116 may operate in tandem with one or more rotational stabilization devices 120 in order to maintain and stabilize the orientation and position of payload 116. In some instances, flywheel 116 may operate in balloon payload orientation control and stabilization system 100 in a configuration in which the one or more rotational stabilization devices 120 are not included.

In such embodiment, flywheel 116 may operate to maintain and stabilize the orientation and position of payload 116.

Figure 5:
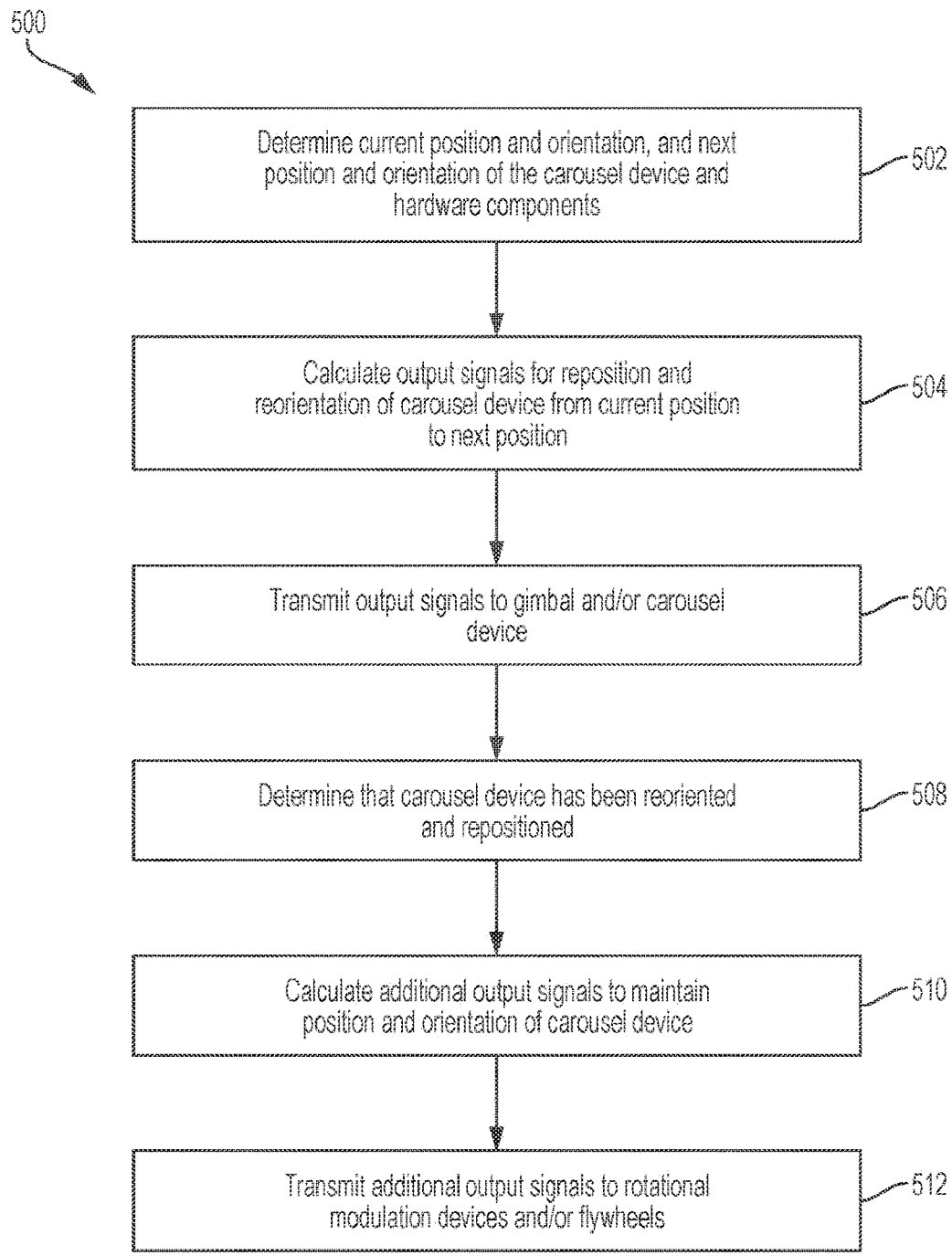
FIG. 5 depicts a flowchart for a second balloon payload orientation control and stabilization method according to one or more aspects described herein.

FIG. 5 shows an illustrative method of orienting and positioning carousel device 300 of the balloon payload orientation control and stabilization system 100. Such a method may be performed on board by balloon payload orientation control and stabilization system 100 by processor 112 or off board at an external processing center. At step 502, the current position and orientation of carousel device 300 may be determined. In certain embodiments, the position and orientation of carousel device 300 may be determined relative to the position and orientation of balloon payload orientation control and stabilization system 100. Additionally, the next position and orientation of carousel device 300 may be determined. The next position and orientation of carousel device 300 may be different than the current position and orientation of carousel device 300.

The determination of the position and orientation of payload may be done through contribution of data provided by sensor 117. In other embodiments, the determination may be done through the utilization of input commands previously generated and executed to achieve the current positioning. The two forms of determination may be performed alone, or in combination. In other instances, other means of determining the position and orientation of carousel device 300 may be used.

In certain embodiments, the current and next positioning of rotatable mechanism 320 may also be determined. As stated above, rotatable mechanism 320 may comprise a plurality of outer faces 322. Each outer face of the plurality of outer faces 322 may serve as fixture point for specialized hardware components. Such hardware components may include, but are not limited to, solar cells, GPS receivers, cameras, sensors, antennas, communication equipment, and the like. At step 502, the currently exposed outer face and the hardware components attached may be determined, as well as the next outer face to be exposed.

At step 504, after determining the current and next orientation and position of carousel device 300, as well as which outer face of the plurality of outer faces 322 is the currently exposed outer face and the next to be exposed outer face, powered gimbal rotational commands may be calculated. Such powered gimbal rotational commands may contain instructions that, when executed, cause powered gimbal 130 to reposition and reorient carousel device 300 to another position and/or orientation. Additionally or alternatively, the powered gimbal rotational commands may contain instructions that, when executed, cause carousel device 300 to reposition and reorient independent of powered gimbal 130. In other embodiments, carousel device 300 and powered gimbal 130 may operate in tandem. Moreover, the powered gimbal rotational commands may contain further instructions that, when executed, cause carousel device 300 to rotate rotatable mechanism 320 to display a different outer face and the hardware components fixed thereof.

At step 506, output signals including the calculated powered gimbal rotational commands may be transmitted to powered gimbal 130 and/or carousel device 300. After receiving the output signals, powered gimbal 130 may reorient and reposition carousel device 300 in a new position and orientation different from the previous position and orientation. Such reorientation and repositioning may be achieved through rotational of powered gimbal 130 around any one, or combination of, a first, second, third, or additional axis of rotation. In embodiments where exposure of a different outer face is called for, output signals may be additionally sent to carousel device 300. In such embodiments, carousel device 300, after receiving the output signals, may activate rotational mechanism 320 and expose a new outer face. In other embodiments where carousel device 300 operates independently of powered gimbal 130, carousel 300 may be reoriented and repositioned through rotation around any one, or combination of, the first, second, or third axis of rotation. In such embodiments, rotatable mechanism 320 may also be activated as called for.

After the output signals for the reorientation and repositioning of carousel device 300 and the plurality of hardware components comprised therein have been transmitted to powered gimbal 130 and/or carousel device 300, a determination may be made at step 508 that such a reorientation and repositioning has been completed.

At step 510, in response to determining that carousel device 300 has been reoriented and repositioned to a new position and orientation, rotational stabilization device rotational commands may be calculated which may comprise instructions for maintaining and stabilizing the position and orientation of carousel device 300 at the new location in specific regards to the yaw axis. In other embodiments, the calculations of rotational stabilization device rotational commands may be made for maintaining and stabilizing the position and orientation of carousel device 300 at the new location in specific regards to the yaw axis, pitch axis, roll axis, or any combination of axes thereof.

The calculation may take into account data provided by sensor 117 regarding external atmospheric phenomena such as wind speed, wind direction, barometric pressure, presence of wind gusts, precipitation, and the like. As stated above, such phenomena may incur rotation around the yaw axis of balloon payload orientation control and stabilization system 100. Accordingly, the calculation of rotational stabilization device rotational commands may adjust for the presence of such phenomena. In some embodiments, the calculations may be done seamlessly and in real-time as atmospheric phenomena changes are detected by sensor 117. The calculations completed at step 510 may also take into account the rotation of balloon payload orientation control and stabilization system 100 around the yaw axis as produced by powered gimbal 130 and/or carousel device 300 during the reorientation and repositioning of carousel device 300.

Moreover, the calculation may take into account additional data provided by sensor 117 and GPS 118 regarding motion and trajectory of balloon payload orientation control and stabilization system 100. For example, if it is desired that carousel device 300 remain fixed towards a specific point in space, calculations of rotational stabilization device rotational commands may take into account the movement of balloon payload orientation control and stabilization system 100 so as to maintain orientation of carousel device 300 towards the specific point.

At step 512, the rotational stabilization device rotational commands may be transmitted in the form of output signals to one or more rotational stabilization devices 120 which, upon receiving the additional output signals, may employ any of a plurality of thrust generating means such as, but not limited to, air thrusters, propellers, impellers, electromagnetic thrusters, rockets, and like, in order to maintain and stabilize the orientation and positioning of carousel device 300. One or more rotational stabilization devices 120 may maintain and stabilize the orientation and positioning of carousel device 300 around the yaw axis of balloon payload orientation control and stabilization system 100. In other embodiments, the one or more rotational stabilization devices 120 may maintain and stabilize the orientation and positioning of carousel device 300 around the yaw, pitch, and/or rolls axis of balloon payload orientation control and stabilization system 100.

In some embodiments, in response to determining that carousel device 300 has been reoriented and repositioned, flywheel rotational commands may be calculated which may comprise instructions for maintaining and stabilizing the position and orientation of carousel device 300 at the new location in specific regards to the yaw axis. In other embodiments, the calculations of flywheel rotational commands may be made for maintaining and stabilizing the position and orientation of carousel device 300 at the new location in specific regards to the yaw axis, pitch axis, roll axis, or any combination of axes thereof.

The calculation may take into account data provided by sensor 117 regarding external atmospheric phenomena such as wind speed, wind direction, barometric pressure, presence of wind gusts, precipitation, and the like. As stated above, such phenomena may incur rotation around the yaw axis of balloon payload orientation control and stabilization system 100. Accordingly, the calculation of flywheel rotational commands may adjust for the presence of such phenomena. In some embodiments, the calculations may be done seamlessly and in real-time as atmospheric change and are detected by sensor 117. The calculations may also take into account the rotation of balloon payload orientation control and stabilization system 100 around the yaw axis as produced by powered gimbal 130 during the reorientation and repositioning of carousel device 300.

Moreover, the calculation may take into account additional data provided by sensor 117 and GPS 118 regarding motion and trajectory of balloon payload orientation control and stabilization system 100. For example, if it is desired that carousel device 300 remain fixed towards a certain point in space, calculations of flywheel rotational commands may take into account the movement of balloon payload orientation control and stabilization system 100 so as to maintain orientation of carousel device 300 towards the certain point.

The flywheel rotational commands may be transmitted in the form of output signals to flywheel 116 which, upon receiving the output signals, may rotate around the yaw, pitch, roll and/or other axis in order to maintain and stabilize the orientation and position of carousel device 300. Flywheel 116 may operate in tandem with one or more rotational stabilization devices 120 in order to maintain and stabilize the orientation and position of carousel device 300. In some instances, flywheel 116 may operate in balloon payload orientation control and stabilization system 100 in a configuration in which the one or more rotational stabilization devices 120 are not included. In such embodiment, flywheel 116 may operate to maintain and stabilize the orientation and position of carousel device 300.

Figure 6:
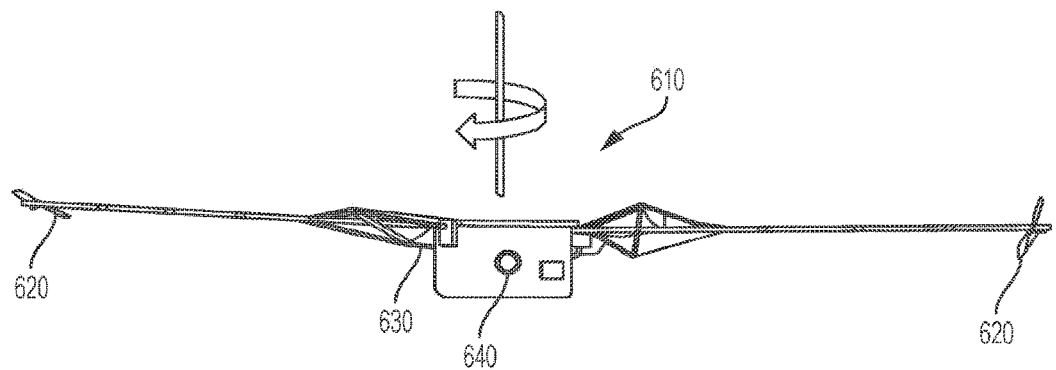
FIG. 6 depicts an illustrative configuration of a central housing unit according to one or more aspects.

FIG. 6 shows an illustrative configuration of a central housing unit 610 and components included therein and attached thereto. Central housing unit 610 may comprise some or all of the hardware/software components as central housing unit 110 as depicted in FIG. 1 and central housing unit 210 as depicted in FIG. 2. As shown in FIG. 6, central housing unit 610 may include one or more rotational stabilization devices 620, solar panel/cell 630, and camera/video recorder 640. As discussed below, central housing unit 610 may include additional components.

Central housing unit 610 may be composed of a foam shell and may contain hardware including power systems, motor drivers, computing electronics, and telemetry and communications hardware, which may include a satellite modem such as an Iridium modem, a UHF radio and a cellular telecommunications modem. Additionally, Central housing unit 610 may include sensors that provide inertial, positioning and orientation information such as GPS, pressure sensors, accelerometers, gyroscopes, magnetometers, and the like. Central housing unit 610 may also include a variety of hardware and instrumentation mounted internally and/or externally including sun-angle sensors and temperature sensors.

Central housing unit 610 may include solar panel/cell 630 and camera/video recorder 640. Solar panel/cell 630 may include a plurality of filters ranging from 320-650 nm and 320-1100 nm and may be configured to exhibit full photocurrent density-voltage (J/V) characteristics at 16-bit ADC. In certain embodiments, solar panel/cell 630 may be a plurality of solar panels/cells. Solar panel/cell 630 may be configured so as to power the entirety of components comprised within, and external to, central housing unit 610, or may be configured to operate in tandem with additional power/battery components included within central housing unit 610.

Camera/video recorder 640 may be mounted on an external face of central housing unit 610 and may be configured to take pictures/record video. In certain embodiments, a plurality of cameras/video recorders may be mounted externally on central housing unit 610. Camera/video recorder 640 may be configured to take one or more pictures at set intervals predetermined and/or pre-stored in memory comprised within central housing unit 610. For example, one or more pictures may be taken every 30 minutes, hour, day, week, etc. The number of pictures and frequency of pictures taken by camera/video recorder 640 may also be predetermined and/or pre-stored in memory. Camera/video recorder 640 may also be configured to take videos at similar intervals for a duration of time (e.g., 30 seconds, 2 minutes, 1 hour, etc.) predetermined and/or pre-stored in memory.

In some instances, camera/video recorder 640 may be configured to take pictures/videos in response to instructions received via communications hardware comprised within central housing unit 610. In other instances, camera/video recorder 640 may take pictures/videos in response to data registered by sensors and/or GPS systems comprised within central housing unit 610 which correlate to predetermined and/or pre-stored data points in memory of central housing unit 610. For example, camera/video recorder 640 may take a picture/video in response to sensors comprised within central housing unit 610 registering specific barometric pressure indicating a severe weather system, or GPS systems indicating that central housing unit 610 is at a certain longitude and latitude, or at a certain height at a certain longitude and latitude.

Image/video data captured by camera/video recorder 640 may be stored locally in memory, or transmitted off-board via communications hardware comprised within central housing unit 610. Transmission of data may be done in real-time, at certain intervals, or in response to receiving an external request via communications hardware.

Central housing unit 610 may be connected to one or more rotational stabilization devices 620 mounted facing the same direction on opposite sides of a vertical plane of the central housing unit 610. While the one or more rotational stabilization devices 620 are shown in FIG. 6 in the form of propellers, alternative momentum generation devices as discussed herein may be used.

One or more rotational stabilization devices 620 may be independently powered such that they generate rotation of central housing unit 610 and the components comprised therein and attached thereto around a vertical axis as shown. In such a configuration, the one or more rotational stabilization devices 620 mounted on spars connected to central housing unit 610 to extend away from the central vertical axis to increase stability and increase the yaw momentum generated by a given amount of thrust.

Figure 7:
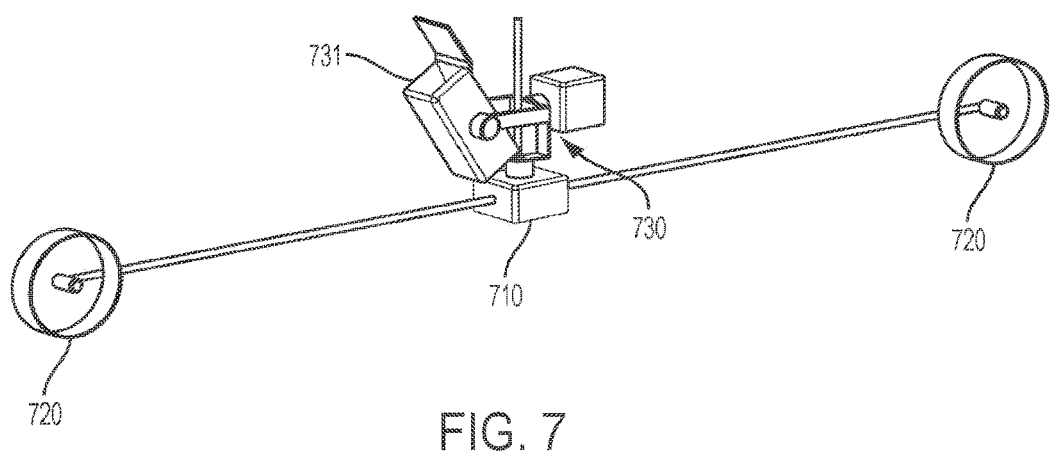
FIG. 7 depicts an illustrative configuration of a central housing unit including a powered gimbal according to one or more aspects.

FIG. 7 shows an embodiment of a central housing unit 710, powered gimbal 730, and components comprised therein and attached thereto. Central housing unit 710 may comprise some or all of the hardware/software components as central housing unit 110 as depicted in FIG. 1 and central housing unit 210 as depicted in FIG. 2, and/or central housing unit 610 described in FIG. 6. Furthermore, powered gimbal 730 may comprise some or all of the hardware/software components as powered gimbal 130 as depicted in FIG. 1 and powered gimbal 230 as depicted in FIG. 2.

As shown in FIG. 7, powered gimbal 730 may be rigidly attached to an upper external face of central housing unit 710. However, in other embodiments, powered gimbal 730 may be attached to other external faces of central housing unit 710. Payload 731 may be attached to powered gimbal 730. Powered gimbal 730 may include multiple motors, which are configured to provide independent rotation around multiple axes. For example, motors may be configured to provide independent tilt, roll, and yaw rotation, and thus allow any orientation of payload 731 to be acquired and maintained. Powered gimbal 730 may be controlled by computing hardware to provide orientation and stabilization control for the payload 731. As stated above, such computing hardware may be comprised within gimbal 730, central housing unit 710, and/or other components comprised within the balloon payload orientation control and stabilization system.

The computing hardware controlling powered gimbal 730 may interface with sensors comprised within central housing unit 710 that provide inertial, positioning and orientation information such as GPS, pressure sensors, accelerometers, gyroscopes, magnetometers, sun-angle sensors, and the like. The computing hardware controlling powered gimbal 730 may then perform calculations to determine the outputs to the motors and/or servos comprised within powered gimbal 730 required to achieve/maintain the desired orientation and send those outputs to the motors/servos, which are manipulated accordingly. Such calculations may be calculated and updated many times a second to provide very rapid and precise orientation control and stabilization of payload 731. The computing hardware controlling powered gimbal 730 may output performed calculations in the form of output signals.

Figure 8:
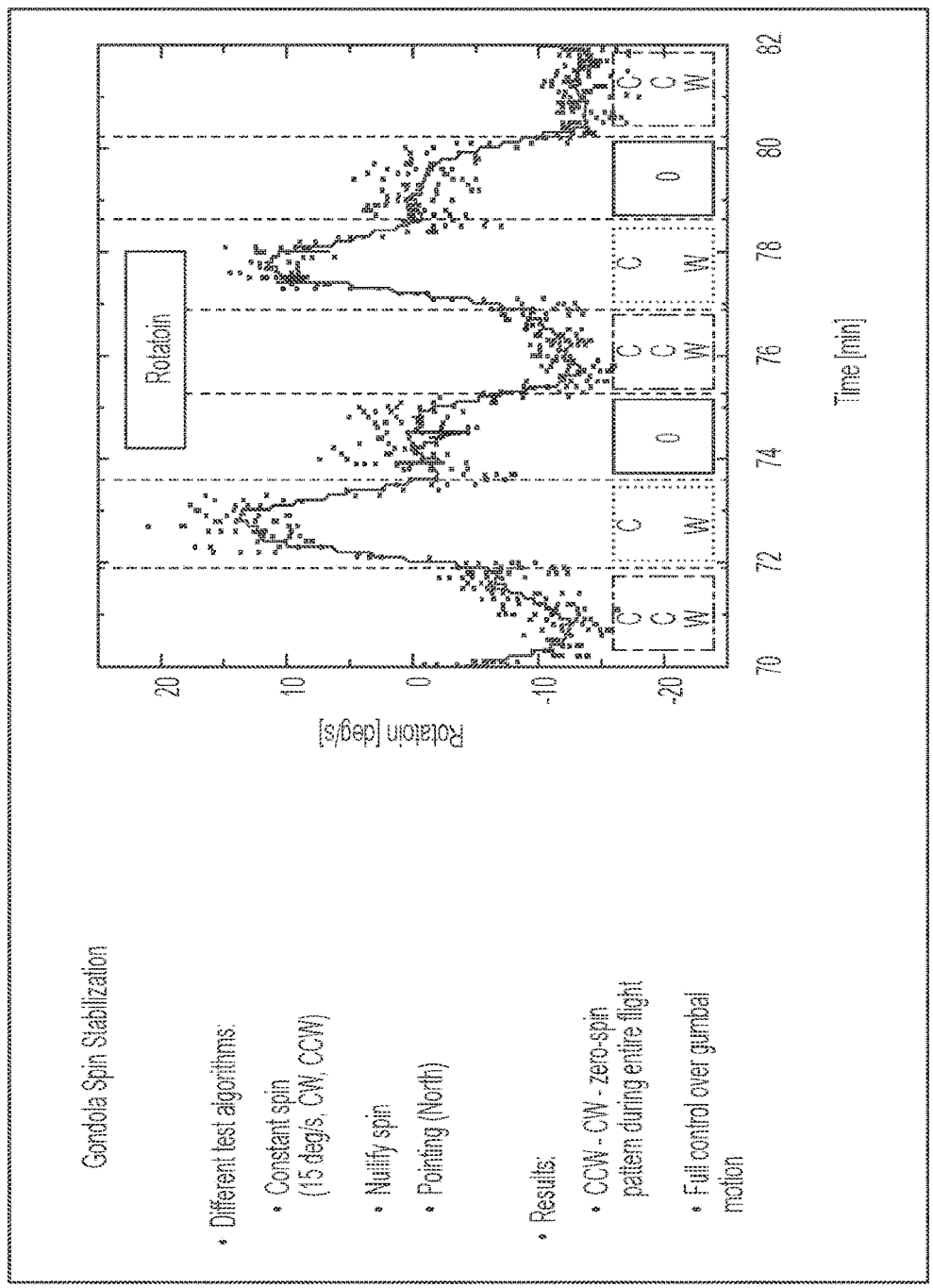
FIGS. 8 & 9 show graphical representations of rotation control and pointing control characteristics of a balloon payload orientation control and stabilization system according to one or more aspects described herein.
Figure 9:
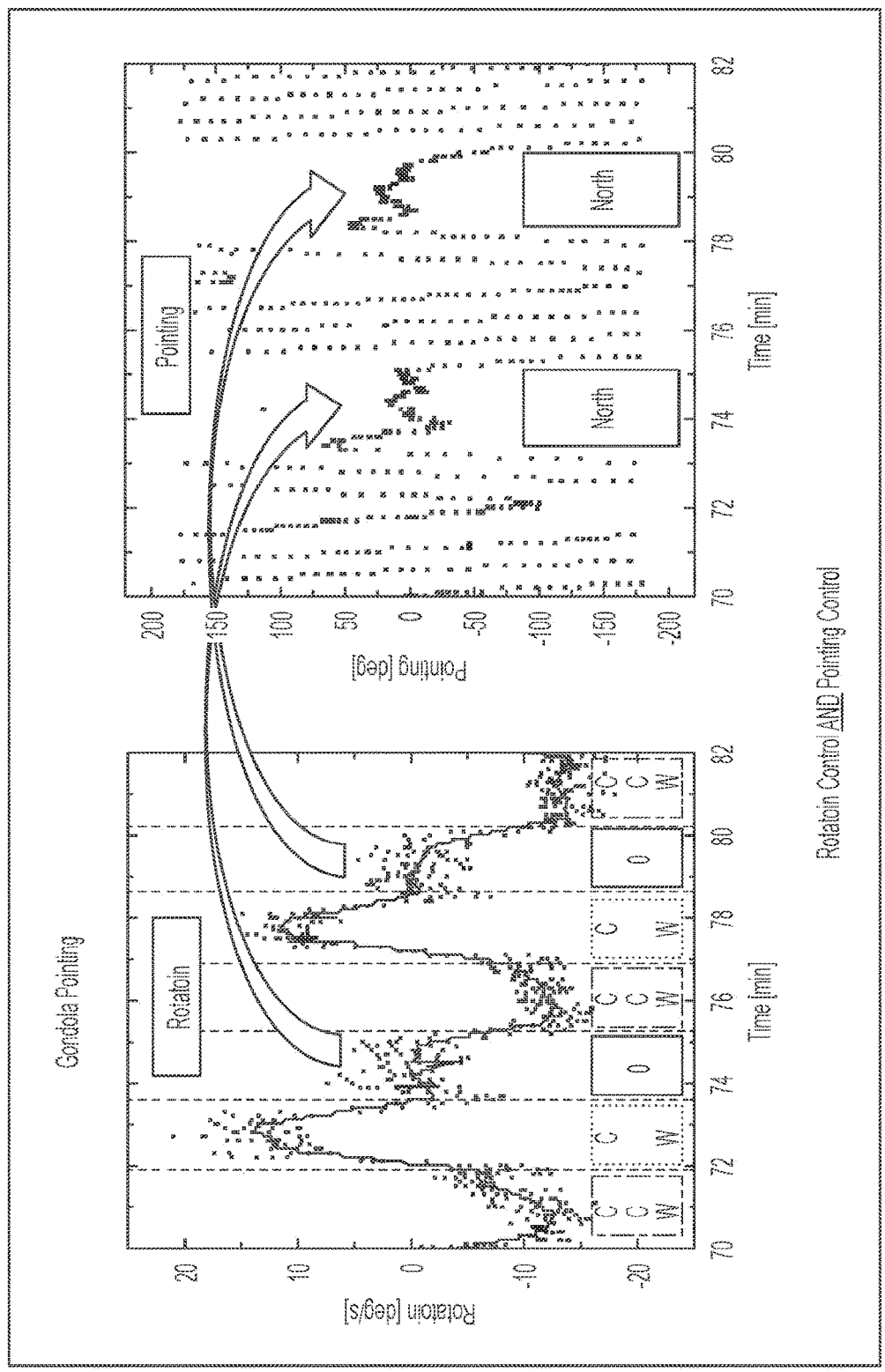

FIGS. 8 and 9 show the rotation control characteristics of the illustrative gondola as the rotational stabilization devices run through three modes: counter-clockwise (CCW) rotation, clockwise (CW) rotation and maintain 0 degree heading. The rotational stabilization devices generate sufficient thrust to maintain consistent rotation characteristics at altitudes in excess of 25 km.

FIG. 8 illustrates performance of the rotational stabilization devices when programmed to control the yaw rotation rate (e.g., spin rate) of the gondola at a rotation of around 15 deg/s in clock-wise (CW) and counter-clock-wise (CCW) and non-rotating (e.g., nullify spin/zero rotation) mode at an altitude higher than 20 km. The rotational stabilization devices allowed the yaw rotation rate to be controlled at the desired rotation rate at all times and at altitudes above 25 km.

FIG. 9 illustrates performance of the rotational stabilization devices when programmed to control the yaw rotation rate (e.g., spin rate) and the yaw pointing (e.g., heading) of the gondola at an altitude higher than 20 km. Additionally, FIG. 9 shows that during non-rotating (e.g., nullify spin/zero rotation) mode, North pointing of the gondola may be achieved repeatedly at all times.

Figure 10:
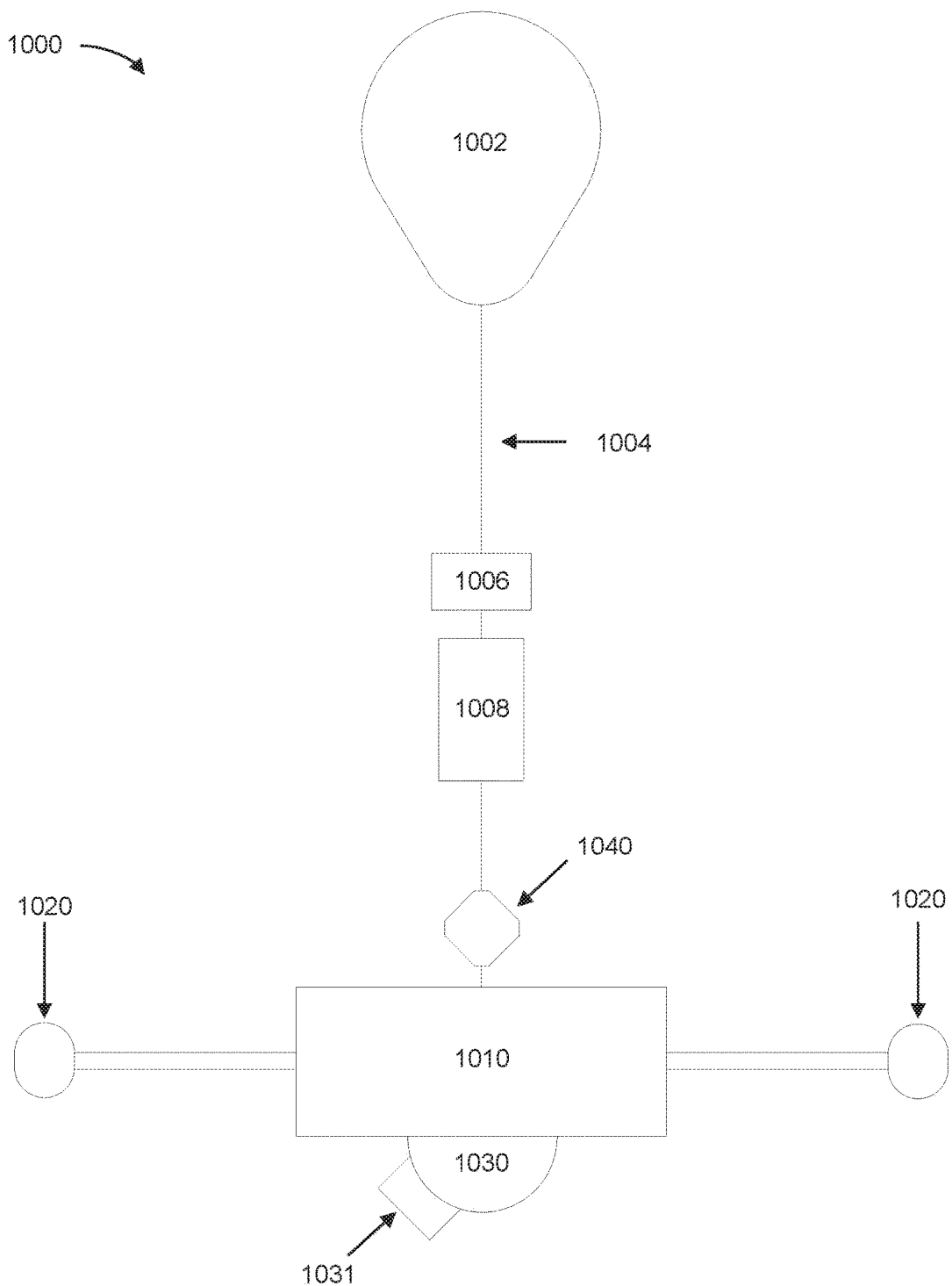
FIG. 10 shows an additional configuration of a balloon payload orientation system according to one or more aspects.

FIG. 10 shows an illustrative embodiment of a balloon payload orientation control and stabilization system 1000. Balloon payload orientation control and stabilization system 1000 may comprise some or all of the hardware/software components as balloon payload orientation control and stabilization system 100 as depicted in FIG. 1 and balloon payload orientation control and stabilization system 200 as depicted in FIG. 2.

The balloon payload orientation control and stabilization system 1000 may include an balloon envelope 1002, a coupling member 1004 attached to a bottom end portion of balloon envelope 1002 at first distal end of coupling member 1004, and a gondola (e.g., central housing unit 1010, one or more rotational stabilization devices 1020, gimbal 1030, and payload 1031) positioned below balloon envelope 1002 and coupled at an upper end portion to a second distal end of coupling member 1004. Coupling member 1004 may be attached to the gondola such that central housing unit 1010 is suspended roughly symmetrically around the axis of the length of cord. Balloon release device 1006, parachute 1008, and radar reflector 1040 may also be fixed to coupling member 1004.

In such an embodiment, parachute 1008 and radar reflector 1040 may be positioned below balloon release device 1006 so as to remain fixed to the gondola after it has been detached from balloon envelope 1002. As described above, balloon release device 1006 may be configured to sever, cut, or detach from coupling member 1004 in order to disengage the gondola from balloon envelope 1002. The balloon release device 1006 may be remotely triggered or may be programmed to trigger automatically via input signals received from the processor comprised within central housing unit 1010.

After the gondola has become disengaged from balloon envelope 1002, parachute 1008 may deploy. Parachute 1008 may deploy in response to activation of balloon release device 1006, or shortly thereafter. Parachute 1008 may include guidance hardware that allows the gondola to perform a controlled descent to the earth's surface. In some embodiments, a plurality of parachutes may be used. Additionally, radar reflector 1040 may be fixed to coupling member 104 below the parachute. Radar reflector 1040 may be configured to respond to incoming radar so as to alert aircraft in the immediate vicinity to the presence of balloon payload orientation control and stabilization system 1000. In certain instances a plurality of radar reflectors may be used. In such instances, reflectors may be positioned on coupling member 102 both above and below the gondola. Alternatively, radar reflectors may be suspended from the one or more rotational stabilization devices.

Figure 11:
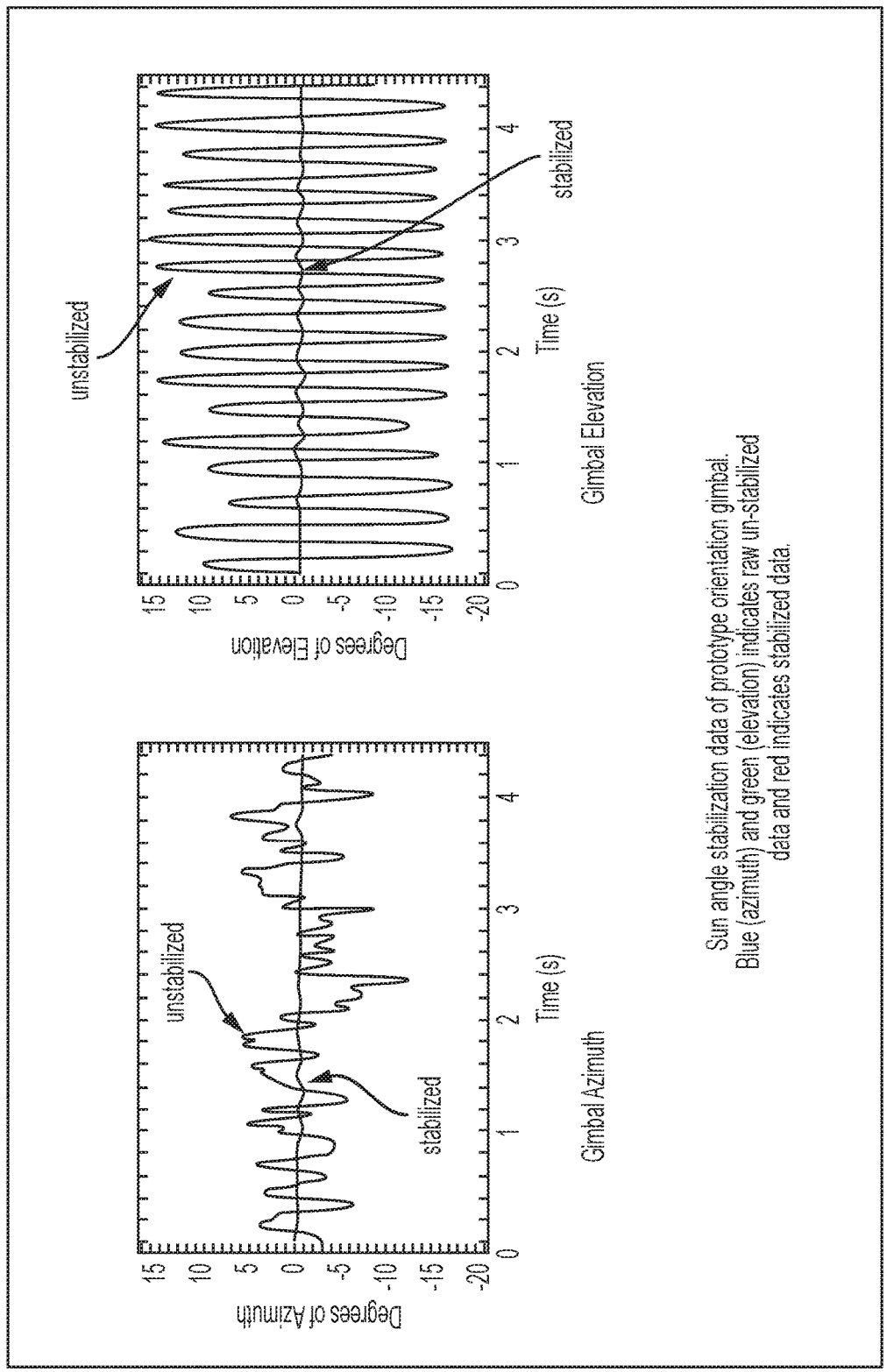
FIG. 11 shows a graphical representation of powered gimbal azimuth and powered gimbal elevation characteristics of a balloon payload orientation control and stabilization system according to one or more aspects described herein.

FIG. 11 depicts the performance characteristics of an example balloon payload orientation control and stabilization system. The combined action of the powered gimbal and thrust generation hardware allows for continuous, high performance orientation control and stabilization of payloads that comprise a significant portion or even a majority of the total gondola mass. Thus a wide range of hardware that benefits from orientation control and/or stabilization can be included in the payload and flown on a small balloon that has not been previously possible on such platforms.

Although the subject matter has been described in language specific to structural features and/or methodological acts, it is to be understood that the subject matter defined in the appended claims is not necessarily limited to the specific features or acts described above. For example, while the description above is with respect to a balloon based system, other lift systems and/or launch vehicles may also be used with and/or benefit from the features described herein. Rather, the specific features and acts described above are disclosed as example forms of implementing the claims.

What is claimed is:

1. A balloon payload stabilization system comprising:
   a balloon envelope; and
   a gondola suspended beneath the balloon envelope, the gondola including:
   a housing unit coupled to one or more rotational stabilization devices, wherein the one or more rotational stabilization devices are configured to stabilize the gondola around at least a first axis of rotation relative to an orientation of the balloon payload stabilization system; and
   a powered gimbal including a payload, wherein the powered gimbal is mechanically coupled to the housing unit and is configured to rotate around one or more axes relative to the orientation of the balloon payload stabilization system to position the payload;
   wherein the payload, when positioned in a first position by the powered gimbal, is stably maintained in the first position via rotation around at least the first axis by the one or more rotational stabilization devices.

2. The balloon payload stabilization system of claim 1, further comprising:
   a coupling member mechanically coupling the balloon envelope to the gondola; and
   a balloon release device positioned on the coupling member between the balloon envelope and the gondola, wherein the balloon release device is configured to decouple the gondola from the balloon envelope.

3. The balloon payload stabilization system of claim 1, wherein the payload comprises a carousel device, said carousel device comprising:
   a collimator including an outer end portion and an inner housing portion, wherein the outer end portion is configured to be positioned and aligned in the first position; and
   a rotatable mechanism disposed within the inner housing portion, the rotatable mechanism comprising a plurality of outer faces,
   wherein the rotatable mechanism is configured to rotate and expose an outer face of the plurality of outer faces to the outer end portion in the first position.

4. The balloon payload stabilization system of claim 3, wherein the rotatable mechanism further comprises a plurality of hardware components, and wherein at least a hardware component of the plurality of hardware components is disposed on each outer face of the plurality of outer faces of the rotatable mechanism.

5. The balloon payload stabilization system of claim 4, wherein the plurality of hardware components includes at least one of: a solar cell, an antenna, a communication device, a GPS receiver, or a camera.

6. The balloon payload stabilization system of claim 1, wherein the one or more rotational stabilization devices includes at least one of: a propeller, an impeller, an air thruster, a gas thruster, an electromagnetic thruster, or a rocket.

7. The balloon payload stabilization system of claim 1, wherein the one or more rotational stabilization devices further comprises one or more rotatable wheels configured to influence rotation around at least the first axis of rotation, and wherein the payload, when positioned in the first position by the powered gimbal, is stably maintained in the first position via the one or more rotatable wheels.

8. A balloon payload stabilization system comprising:
   a balloon envelope; and
   a gondola mechanically coupled to the balloon envelope, the gondola including:
      one or more rotational stabilization devices configured to stabilize the gondola around at least a first axis of rotation relative to an orientation of the balloon payload stabilization system;
      a powered gimbal configured to rotate around one or more axes relative to the orientation of the balloon payload stabilization system; and
      a payload coupled to the powered gimbal, the payload configured to be positioned by the powered gimbal.

9. The balloon payload stabilization system of claim 8, further comprising:
   a coupling member mechanically coupling the balloon envelope to the gondola; and
   a balloon release device positioned on the coupling member between the balloon envelope and the gondola, wherein the balloon release device is configured to decouple the gondola from the balloon envelope.

10. The balloon payload stabilization system of claim 9, further comprising:
    one or more processors; and
    memory storing computer-readable instructions that, when executed by the one or more processors, cause the balloon payload stabilization system to:
    determine that the balloon payload stabilization system has reached a predetermined altitude; and
    in response to determining that the balloon payload stabilization system has reached the predetermined altitude, transmitting, to the balloon release device, third output signals triggering the decoupling of the gondola from the balloon envelope.

11. The balloon payload stabilization system of claim 10, wherein the payload is a carousel device comprising:
    a collimator including an outer end portion and an inner housing portion, wherein the outer end portion is configured to be positioned and aligned; and
    a rotatable mechanism positioned within the inner housing portion, the rotatable mechanism including a plurality of outer faces,
    wherein the rotatable mechanism is configured to rotate and expose an outer face of the plurality of outer faces to the outer end portion, wherein the rotatable mechanism comprises a plurality of hardware components, and wherein at least a hardware component of the plurality of hardware components is disposed on each outer face of the plurality of outer faces of the rotatable mechanism.

12. The balloon payload stabilization system of claim 11, wherein the plurality of hardware components includes at least one of: a solar cell, an antenna, a communication device, a GPS receiver, a barometer, or a camera.

13. The balloon payload stabilization system of claim 12, wherein the computer-readable instructions, when executed by the one or more processors, further cause the balloon payload stabilization system to:
    determine at least a hardware component of the plurality of hardware components to be used;
    in response to determining at least the hardware component of the plurality of hardware components, rotate the rotatable mechanism to expose a first outer face of the plurality of outer faces to the outer end portion of the collimator.

14. The balloon payload stabilization system of claim 8, wherein the one or more rotational stabilization devices comprises one or more rotatable wheels configured to stabilize around at least the first axis of rotation.

15. The balloon payload stabilization system of claim 14, further comprising:
    one or more processors; and
    memory storing computer-readable instructions that, when executed by the one or more processors, cause the balloon payload stabilization system to:
    determine that the powered gimbal has positioned the payload from a first position to a second position; and
    in response to determining that the payload has been positioned to the second position by the powered gimbal, calculate rotational commands for the one or more rotatable wheels, corresponding to maintaining and stabilizing the second position of the payload; and
    transmit third output signals to the one or more rotatable wheels, wherein the third output signals include the rotational commands.

16. A method comprising:
    determining a first position of a payload within a powered gimbal mechanically coupled to a central housing unit suspended beneath a balloon envelope, wherein the first position corresponds to a current position of the payload;
    determining a second position of the payload, wherein the second position corresponds to a desired position of the payload;
    in response to determining the first position, calculating powered gimbal rotational commands corresponding to positioning the payload by a powered gimbal to the second position from the first position;
    transmitting first output signals to the powered gimbal, wherein the first output signals include the powered gimbal rotational commands;
    determining that the powered gimbal has positioned the payload to the second position;
    in response to determining that the payload has been positioned to the second position by the powered gimbal, calculating rotational stabilization device rotational commands corresponding to maintaining and stabilizing the second position of the payload; and
    transmitting second output signals to one or more rotational stabilization devices, wherein the second output signals include the rotational stabilization device rotational commands.

17. The method of claim 16, further comprising:
    determining that a balloon payload stabilization system has reached a predetermined condition; and
    in response to determining that the balloon payload stabilization system has reached a predetermined condition, transmitting, to a balloon release device, third output signals to decouple the gondola from a balloon envelope.

18. The method of claim 16, wherein the payload is a carousel device, and wherein the calculating powered gimbal rotational commands further includes:
    determining at least a hardware component of a plurality of hardware components positioned within a rotatable mechanism of the carousel to be used;
    in response to determining at least the hardware component of the plurality of hardware components, rotating the rotatable mechanism to expose a first outer face of a plurality of outer faces to an outer end portion of a collimator, wherein at least the hardware component of the plurality of hardware components is disposed on the first outer face.

19. The method of claim 18, wherein the plurality of hardware components include at least one of: a solar cell, an antenna, a communication device, a GPS receiver, a barometer, and a camera.

20. The method of claim 16, further comprising:
   determining that the powered gimbal has positioned the payload to the second position; and
   in response to determining that the payload has been positioned to the second position by the powered gimbal, calculating rotational commands corresponding to maintaining and stabilizing the second position of the payload using one or more rotatable wheels; and
   transmit fourth output signals to the one or more rotatable wheels, wherein the fourth output signals include the rotational commands.

21. The method of claim 7, wherein each rotatable wheel comprises one or more of a flywheel and a reaction wheel.

* * * * *